Aug. 1, 1939.  H. E. WANER  2,168,012
PROTECTIVE COVERING FOR AIRCRAFT SURFACES AND THE LIKE
Filed Sept. 29, 1937
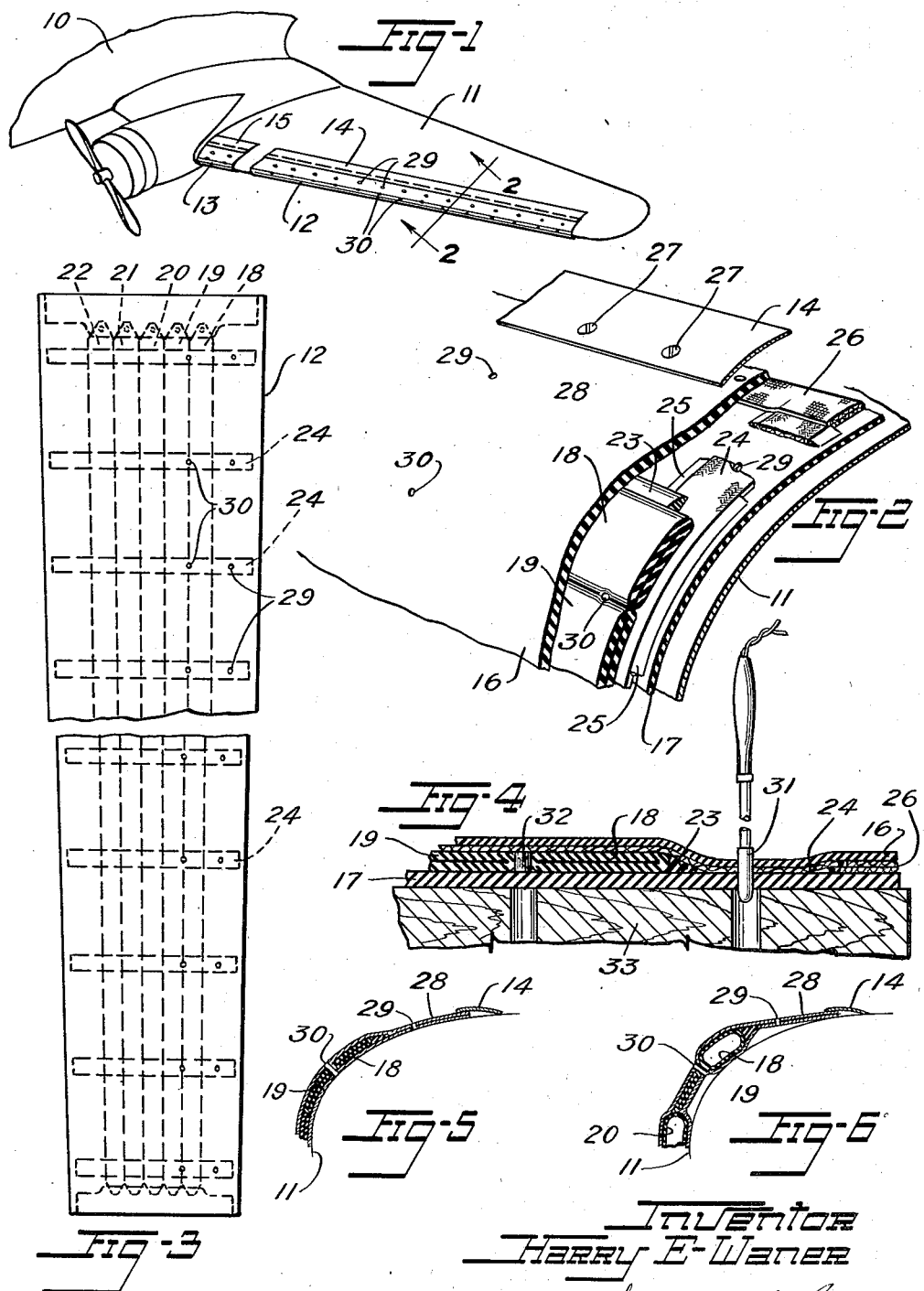

Patented Aug. 1, 1939

2,168,012

UNITED STATES PATENT OFFICE 2,168,012

PROTECTIVE COVERING FOR AIRCRAFT SURFACES AND THE LIKE

Harry E. Waner, Akron, Ohio, assignor to The B. F. Goodrich Company, New York, N. Y., a corporation of New York Application September 29, 1937, Serial No. 166,322

6 Claims. (Cl. 244—134)

This invention relates to protective covering for the surfaces of aircraft and other vehicles and structures, and is especially useful in its application to inflatable coverings or shoes for preventing accumulation of ice on the leading edges of wings and other airfoils and on struts and other surfaces of aircraft. The invention is useful also in coverings such as abrasion-resisting shoes for aircraft.

Owing to the presence of the aerodynamic forces at the leading edge of an airplane wing, for example, there is a tendency in some cases for portions of flexible or resilient cover, such as an inflatable shoe, to lift away from the wing surface when that is not desired, or to hug close to the wing surface when it is desired to have it move away.

The chief objects of the invention are to provide an improved construction whereby such tendency is overcome, to provide an improved inflatable shoe that maintains the desired shape both when uninflated and during inflation, and to provide a strong and durable construction.

These and further objects will be apparent from the following description, reference being had to the accompanying drawing, in which:

Fig. 1 is a perspective view, with parts broken away, of an airplane having a wing covering constructed according to and embodying the invention in its preferred form.

Fig. 2 is a perspective view, with parts broken away and sectioned, the view being taken along the line 2—2 of Fig. 1.

Fig. 3 is a plan view of the covering or inflatable shoe before its application to the airplane wing.

Fig. 4 is a vertical section of a portion of the shoe illustrating a manner of constructing it according to the invention.

Fig. 5 is a cross section of an inflatable shoe mounted upon the leading edge of a wing or other airfoil, the shoe being in its deflated condition.

Fig. 6 is a view like Fig. 5 but showing the shoe at an inflation stage.

The invention is illustrated as applied to an inflatable shoe adapted to be mounted at the leading edge of an airplane wing for preventing excessive accumulation of ice, and the invention includes the provision of means for maintaining parts of the shoe in the desired form despite the presence of aerodynamic forces tending to hold such parts distorted to undesired shapes.

Referring to the drawing:

An airplane 10 has mounted upon the leading edge of its wing 11 shoe units 12 and 13 of elastic construction, these units preferably being mounted in a stretched condition generally chord-wise of the wing and being secured to the wing surface or its internal structure along the upper and lower margins which extend along the wings in the general direction of its span. Fairing strips 14 and 15 are preferably provided at the attached margins of the shoes. Each shoe may comprise upper and lower layers 16 and 17 of elastic rubber or rubber-like material between which are sandwiched a plurality of inflatable tubes 18, 19, 20, 21 and 22 extending longitudinally of the shoe, these tubes preferably being of rubber composition reinforced by an elastic fabric. Filler strips 23 may be provided at the margins of the outside tubes to prevent an abrupt bending of the rubber layer 16 at these places. For the purpose of providing additional tear resistance to the structure elastic reinforcing tapes 24, 24 may be provided at intervals along a span with rubber filler strips 25, 25 at their margins in a manner described more fully in the co-pending application of Myron L. Taylor, Serial No. 160,105, filed August 20, 1937.

The attaching margin of the shoe may be reinforced by a strip element 26 of fabric or other suitable material and the attachment may be effected as by screws 27, 27 passing through the fairing strip, the shoe, and into the structure of the wing 11. The rubber and fabric parts of the shoe are preferably united as a unit by vulcanization.

In operation, alternate tubes of the shoe may be inflated or deflated in groups intermittently to vary the surface parts of the shoe and thereby break up ice accumulated on the surface in a manner for example as is described in the patent to Geer, No. 1,998,809, dated April 23, 1935.

During inflation, portions of the shoe, including the inner lining rubber layer 17, are caused to stand away from the wing surface by the distension of the shoe. The portion 28 of the shoe between the upper-most tube 18 and the upper-most attaching margin of the shoe is an elastic region under tension generally chord-wise of the wing owing to its being mounted under tension and because during inflation of the shoe it is subjected to further stretch. When the shoe is uninflated it is desired that the portion 28 as well as the other portions of the shoe lie flat against the surface of the wing as is shown in Fig. 5. When the tube 18 is inflated it is desired that the portion 28 stand outwardly from the wing surface in the manner shown in Fig. 6 so that a smooth continuity of the surface may be provided. In the deflated position of Fig. 5 the shoe portion 28 is subjected to the aerodynamic lifting force present at the upper surface of the wing and if any air should find its way between the inner side of the shoe and the surface of the wing upward bulging of the portion 28 may occur which would be objectionable from the aerodynamic standpoint. Also during inflation of the shoe the portion 28 may hug objectionably against the wing surface and not stand out to the position of Fig. 6 if the space between the under side of the shoe and the surface of the wing is air tight. To the end of providing for maintaining the shoe flat against the wing surface in its uninflated condition and of permitting the portion 28 to assume fully the position of Fig. 6 upon inflation, I provide a series of apertures 29, 29 through the shoe in the region 28 so that air may pass through the shoe and prevent the accumulation of a bulging pressure which may disturb the flat condition of Fig. 5 and also destroy rarefication between the under side of the shoe and the wing surface which might prevent the portion 28 from being drawn out fully to the positions of Fig. 6. I have found that the provision of the apertures 29 perform this double function effectively, even though they be very small. Apertures of a diameter of about $\frac{3}{16}$ of an inch have given good results.

In the formation of shoes for large wings with thick leading edges a second series of apertures 30, 30 may be provided between the upper-most tube 18 and the next adjacent tube 19 to assist the action of the apertures 29, 29.

In order that the apertures will not weaken the structure undesirably despite the fact that the rubber and other parts of the shoe are subjected to tension, the apertures are preferably provided in the regions of the tapes 24, 24 of fabric so that there is ample reinforcement in the region of the apertures. The apertures may be provided by forcing a heated iron 31 through the materials of the vulcanized shoe in the manner shown in Fig. 4 upon an apertured support 33. In providing the apertures 30, 30 between the tubes 18, 19 it is desired to avoid injury to the tubes such as might cause leakage and for this purpose a plug 32 of vulcanized hard rubber or other non-plastic material may be assembled in its proper place with the other materials of the shoe and after the shoe has been vulcanized the apertures 30, 30 may be formed by means of the heated iron 31, the plugs 32 serving as locating means. The iron 31 may be passed through the shoe at one side of the plug and then passed through the opposite side of the shoe to the plug whereupon the plug may be forced through the shoe and a through-aperture provided, all without injury to the tube.

While the invention has been illustrated and described in its application to a shoe for preventing accumulation of ice upon the leading edges of wings it has utility also in connection with protective coverings for other types of airfoils and other parts of aircraft and other structures where it is desired to provide a flow of air from one face of a flexible element to another face for the purpose of maintaining the element in a desired position despite the action of dynamic air forces upon the element.

Variations may be made without departing from the invention as it is hereinafter claimed.

I claim:

1. The method of making an inflatable covering shoe for aircraft, which method comprises assembling inflatable elements with a plurality of elastic sheet elements of rubber-like material in superimposed relation with said elements while incorporating adjacent an inflatable element thereof a plug of non-plastic material between the sheet elements, vulcanizing the assembled structure and providing in line an aperture through the sheet elements at the plug with the same and removing the latter to provide an aperture through the shoe.

2. The method of making an inflatable covering shoe for aircraft which method comprises assembling a plurality of adjacent tubes of rubber-like material with covering sheets of rubber-like material in superimposed relation and disposing between adjacent tubes a plug of non-plastic material, vulcanizing the assembled structure, and providing an aperture through said sheets and between said tubes in line with said plug and removing the latter to provide an aperture through the shoe.

3. The method of making a covering shoe including a vented stretchable area of resilient rubber-like material for preventing the accumulation of ice upon a surface, which method comprises incorporating with a sheet of said material a plug of a stiffer substance than said material, vulcanizing the assembled structure, and providing an aperture through the sheet in line with said plug.

4. Apparatus for preventing the accumulation of ice upon a surface, said apparatus comprising a covering for the surface including a stretchable area of the covering of resilient rubber-like material, means for intermittently moving said stretchable area of the covering away from said surface and distorting said covering, reinforcing means extending over a relatively small part of said stretchable area to resist tearing of said part while nevertheless permitting adequate stretching of an adjacent portion of said area for effectively preventing ice accumulation, the reinforced part of said area having an aperture through it to promote equalization of air pressure at the two faces of said area so that the movement of said area away from and to said surface will not be objectionably resisted by a differential of air pressure at said faces.

5. Apparatus for preventing the accumulation of ice upon a surface, said apparatus comprising a stretchable sheet of rubber-like material adapted to be mounted in a condition of stretch upon said surface, inflatable means for distorting said sheet and moving an area thereof away from said surface, reinforcing strips of stretchable fabric material adhered to said sheet and extending across said area in spaced-apart relation to provide intervening zones of the sheet of adequate stretchability for effectively preventing ice accumulation thereon while providing tear-resistance in the portions of the sheet occupied by said strips, said portions being apertured to promote equalization of air pressure at the two faces of said area so that the movement of said area away from and to said surface will not be objectionably resisted by a differential of air pressure at said faces.

6. Apparatus as defined in claim 5 in which the inflatable means comprises adjacent tubes of rubber-like material having the stretchable fabric strips extending thereover and in which apertures are provided also through the structure between said tubes and at the strips.

HARRY E. WANER.

CERTIFICATE OF CORRECTION.

Patent No. 2,168,012. August 1, 1939.

HARRY E. WANER.

It is hereby certified that error appears in the printed specification of the above numbered patent requiring correction as follows: Page 2, second column, line 7, claim 1, strike out the words "in line" and insert the same after "plug" in line 8, same claim; and that the said Letters Patent should be read with this correction therein that the same may conform to the record of the case in the Patent Office.

Signed and sealed this 3rd day of October, A. D. 1939.

(Seal)

Henry Van Arsdale,
Acting Commissioner of Patents.